United States Patent [19]
Besner et al.

[11] Patent Number: 6,063,883
[45] Date of Patent: May 16, 2000

[54] PERMANENT DECREASE OF WOOD HARDNESS BY IN SITU POLYMERIZATION OF PREPOLYMERS

[75] Inventors: André Besner, Montreal; Alain Vallee, Varennes; Jean-François Labrecque, Montreal; Roland Gilbert, Dunham, all of Canada

[73] Assignee: Hydro-Quebec, Montreal, Canada

[21] Appl. No.: 09/000,977

[22] Filed: Dec. 30, 1997

Related U.S. Application Data

[63] Continuation-in-part of application No. 08/511,431, Aug. 4, 1995, Pat. No. 5,731,096.

[51] Int. Cl.[7] .............................. B32B 21/08; B05D 3/00
[52] U.S. Cl. ..................... 526/200; 427/393; 427/440; 428/511; 428/513; 428/514; 428/536; 428/537.1; 428/541
[58] Field of Search ........................... 526/200; 427/393, 427/440; 428/541, 514, 536, 537.1

[56] References Cited

U.S. PATENT DOCUMENTS 5,731,096  3/1998  Besner ..................................... 428/514

*Primary Examiner*—Fred Zitomer
*Attorney, Agent, or Firm*—Oblon, Spivak, McClelland, Maier & Neustadt, P.C.

[57] ABSTRACT

A wood article is submitted to a vacuum in an autoclave to remove air that it contains. Then, a solution which contains a water-soluble cross-linkable prepolymer, a polymerization initiator and optionally a wood preservative is introduced into the autoclave. Polymerization to form a polymeric network in the wood article is carried out in an atmosphere which may be substantially free of oxygen, while the optionally present preservative is chemically fixed to the wood. The result is a wood article with a permanently reduced hardness and an increased moisture content at equilibrium.

37 Claims, No Drawings

PERMANENT DECREASE OF WOOD HARDNESS BY IN SITU POLYMERIZATION OF PREPOLYMERS

CROSS-REFERENCE

This application is a continuation-in-part of application Ser. No. 08/511,431, now U.S. Pat. No. 5,731,096, filed Aug. 4, 1995.

BACKGROUND OF INVENTION (a) Field of the Invention

The invention consists in treating wood to permanently reduce its hardness. More particularly, the present invention relates to a treatment for providing a permanent decrease of the hardness of wood, and an increased moisture content at equilibrium by in situ polymerization of prepolymers therein. The invention is also directed to articles of wood which are impregnated with polymeric networks providing a permanent reduction of their hardness, and an increased moisture content at equilibrium.

(b) Description of Prior Art

Contrary to oil-borne formulations, wood preservatives formulations based on water soluble chemicals cause wood to harden and check, making wooden posts more difficult to climb. The most common waterborne preservatives based on copper and chromium are copper-chromium (CC), copper-chromium-arsenate (CCA), copper-chromium-boron (CCB), copper-chromium-fluoride (CFK), copper-chromium-fluoroborate (CCFB) and copper-chromium-phosphorous (CCP). Other waterborne preservatives exist that include copper or chromium. The most common formulations are ammoniacal copper arsenate (ACA), ammoniacal copper zinc arsenate (ACZA), chromated zinc chloride (CZC) and copper-quaternary ammonium compound (ACQ). A CCA type C solution normally contains 19% CuO, between 16 and 45% $As_2O_5$ and between 36 and 65% $CrO_3$. To these particular CCA formulations, various additives may be added which have the property of decreasing wood hardness to a level wherein its climbability is acceptable. These additives include polyethylene glycol (PEG 1000), marketed under the trade designation CCA-PEG, and polyethylene glycol of higher molecular weight (PEG 8000), marketed under the trade designation CCA-PEG+. Another additive is a wax which makes wood impermeable and which has been marketed under the trade designation CCA-ULTRAWOOD®. Finally, an additive based on a formulation containing an oil emulsion in water is sold under the trade designation CCA-ET™.

Treatment of posts with CCA or equivalent waterborne preservatives is normally carried out under specific conditions described in the Standard C4-91 of the American Wood Preservers' Association (AWPA) or the equivalent Standard CAN/CSA-O80.4-M89 of the Canadian Standards Association (CSA) according to a so-called "full-cells" process.

Generally, the posts are introduced into an autoclave in which a vacuum (e.g. 636 mm Hg) is applied to remove the air contained in wood cells. Then, the treating solution of CCA at 2% is introduced into the autoclave and a maximum pressure of for example 1040 kPa is applied so as to enable the penetration of the preservative into wood. This pressure is maintained for about 5 hours for red pine and the solution is thereafter flushed away. CCA is then fixed to the wood at a temperature of for example 60° C. for a few hours.

It has been shown by Gilbert et al. in Forest Products Journal, 47:3, (1997), pp 81–88, that formulations containing PEG 1000 are not permanent since an important fraction of the polyethylene glycol located in the first two centimeters of depth is washed away when posts treated therewith are in use. On the other hand, wax formulations cause the wood to harden since the latter dries by losing its natural humidity, which cannot be restored due to its surface which is made impermeable. Finally, although the treatment with an oil emulsion appears to ensure appropriate climbability characteristics, the oil is not bound to the wood and is therefore free to migrate out of the pole.

Japanese Laid-Open Application 1196302 published Aug. 8, 1989 discloses a method wherein a woody material is impregnated with an aqueous solution of water soluble and radically polymerizable compounds, water soluble and radically polymerizable metal salts of organic acids and possibly water soluble salts of inorganic acids. The radically polymerizable compounds may be glycerin di(meth)acrylate, trimethylolpropane tri(meth)acrylate, polyethylene glycol mono(meth)acrylate or polyethylene glycol di(meth)acrylate. The water soluble and radically polymerizable metal salts are preferably acrylates of Zn, Ba, Ca, Mg or Al. Wood thus treated has good durability, flame resistance, hardness, dimensional stability, rot resistance and insect resistance. This document however does not disclose a specific hardness which is maintained during the entire life of a pole.

Japanese Laid-Open Application 5220712 published Aug. 31, 1993 discloses treating wood material with a formulation comprising polyethylene glycol monoacrylate and/or polyethylene glycol monomethacrylate, a cross-linking agent and a polymerization catalyst. Wood material thus treated has improved durability and dimensional stability at a low impregnation degree. As in the previous Laid-Open Application nothing is mentioned about the production of a wood article having a permanent reduced hardness.

Japanese Patent 79012524 dated May 23, 1979 describes the manufacture of wood plastic composites using an ethylenically unsaturated monomer and a polymerization initiator, thereby preventing local heating and excess buildup. This patent is mute with respect to the hardness of a wood treated by that process, and is therefore not relevant to the subject matter of the present invention.

U.S. Pat. No. 4,567,115 issued Jan. 28, 1986 describes treating wood with an aqueous solution containing water, hexavalent chromium, copper, arsenic and polyethylene glycol 1000. The polyethylene glycol 1000 introduced into the wood treated by this process is easily washed away so that the reduced hardness obtained is not permanent.

Canadian Patent No. 1,187,255 issued Sep. 21, 1989 corresponds to U.S. Pat. No. 4,567,115.

Japanese Laid-Open Application 9160645 published Mar. 26, 1991 discloses the preparation of resin-impregnated wood for exterior walls by immersing wood in a polymerizable resin solution including a pyrolignous acid as a preservative. Contrary to the teaching of the present invention, the material obtained is hard (high strength) and does not undergo a permanent reduced hardness.

U.S. Pat. No. 5,098,589 issued Mar. 24, 1992 describes a polymer made of an alkylene oxide chain which can be used as an ion-conductive conductive polymer electrolyte. There is no teaching whatsoever that the polymer may be used to reduce the hardness of wood.

U.S. Pat. No. 3,713,943 issued Jan. 30, 1973 describes a process for treating wood with a polyethylene adduct of a compound containing multi active-hydrogen functionality. This treatment improves the bondability of the wood by reducing the criticality of drying conditions. This has nothing to do with hardness reduction in wood.

Canadian Patent No. 907,232 issued Aug. 8, 1972 relates to the preservation of wood using a monomeric or polymeric methylacrylate which is used in association with a preservative, in order to prolong the service life of wood products, and has nothing to do with the reduction of wood hardness.

Canadian Patent No. 866,158 issued Mar. 16, 1971 describes a method of manufacturing hard, synthetic polymer-containing wood wherein wood is impregnated with a mixture of a monomer, an additional polymer and a free radical catalyst. The method gives a hard product contrary to the aim of the present invention, which instead intends to reduce its hardness.

U.S. Pat. No. 4,205,097 issued May 27, 1980 relates to a process for producing an impregnated article by impregnating it with a polymerizable solution followed by heat treatment, so as to give a product which needs no after-treatment. Again this treatment has nothing to do with reduced hardness of the product obtained.

Swedish Patent 9002302 issued Jun. 29, 1990 relates to a wood treatment with a multi functional allyl ether, a (meth) acrylate terminated polyether and/or urethane prepolymer to provide a wood which is dimensionally stable. This invention is of course totally unrelated to the aim of the present invention which intends at permanently reducing the hardness of wood.

Japanese Laid-Open Application 4259506 published Sep. 16, 1992 discloses the use of a dicarboxylic anhydride with a methacrylate to impregnate wood in order to give it high dimensional stability and weather resistance. The same comments apply as those made with respect to Swedish Patent 9002302.

Other references of interest include French Application 2,661,685 published Nov. 8, 1991, Canadian Application No. 2,041,561 published Nov. 2, 1991 and French Application 2,278,708 published Feb. 13, 1978.

It will be seen that none of the references mentioned above provides for a method or a product wherein hardness is substantially permanently reduced, as well as an increased moisture content at equilibrium.

There is thus a need for a treatment with an additive which enables to permanently reduce wood hardness.

SUMMARY OF INVENTION

In accordance with a broad aspect of the invention there is provided a treatment for wood which includes the steps of (a) providing articles of wood, (b) introducing these articles of wood into an autoclave under conditions to substantially remove the air contained therein, (c) introducing into the autoclave a solution optionally containing a wood preservative, and impregnating the articles of wood with the solution, and (d) submitting the articles of wood which have been impregnated to a temperature higher than ambient for fixation of the optionally present preservatives. The treatment is characterized in that the solution optionally containing the wood preservatives also contains at least one water soluble prepolymer of low molecular weight (<10,000) having reactive groups which can be specifically localized at the end of the main or lateral chains, or statistically or block distributed in the main chain, in order to ensure a multi-dimensional cross-linking in the wood in the presence of the solution optionally containing the wood preservatives. The method may comprise adding the wood preservative into the treatment solution, and impregnating the articles of wood with the wood preservative during step (c), or it may comprise impregnating the wood preservatives into the wood articles before introducing them into the treatment solution, the latter then being substantially free of wood preservative. The method may also comprise treating articles of wood only with the prepolymer without using a wood preservative. The reactive groups enabling cross-linking may be selected from the allyl, vinyl, acrylate or methacrylate or issued from compounds having at least one reactive double bond. The solution also contains a polymerization initiator. The solution could optionally contain a crosslinking agent to increase the efficiency of the crosslinking reaction. The crosslinking agent could be selected from the group consisting of trimethylolpropane trimethacrylate, trimethylolpropane triacrylate, glycerol trimethacrylate and glycerol triacrylate. Step (d) is characterized in that it is carried out in a gaseous atmosphere which may be substantially free of oxygen or which may comprise air under conditions to allow for the polymerization of the prepolymers. The treatment enables to reduce the hardness of the wood and to increase the moisture content of the wood at equilibrium while ensuring reduced hardness and increased moisture content to be maintained during aging of the wood outside under leaching conditions, substantially at the same level as immediately following the treatment.

Preferably, the wood preservatives are based on hydro-soluble formulations.

Step (b) is normally carried out under a vacuum of about 600 mm Hg, preferably under a vacuum of 636 mm Hg.

Step (c) consists of introducing the solution that contains preferably about 2% w/v of chromated copper arsenate into the autoclave at a pressure of about 1000–1040 kPa, preferably 1040 kPa, so as to facilitate penetration of the preservative into wood. Preferably the solution contains about 4 to 10% w/v of prepolymer and up to about 5 weight percent of polymerization initiator with respect to the prepolymer.

The pressure may be maintained at that level for about 5 hours for red pine, after which the solution is flushed away from the autoclave. Step (d) is normally carried out at a temperature between about 25 and 100° C. for a period of time, preferably for about 2.5 to 48 hours, that allows for a substantial fixation of all the optionally present wood preservative components in the wood and for polymerization of the prepolymers in the wood.

The prepolymer which may be used may be selected from the following:

i) copolymer of formula:

wherein A is a homopolymer or copolymer of ethylene oxide or derivatives thereof, and B' is an acrylate group of the formula:

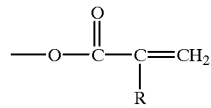

wherein R is H or $CH_3$. The most suitable prepolymer is a polyethylene glycol diacrylate or dimethacrylate, commercially available from Polysciences in a plurality of molecular weights;

ii) copolymer of formula:

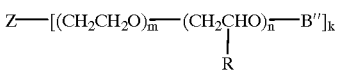

described in U.S. Pat. No. 5,159,001, incorporated by reference, wherein

Z is a residue of a compound having at least one active hydrogen, k is a whole number between 1 and 6, m is a number equal to 0 or whole number not less than 1, n is a number equal to 0 or whole number not less than 1, B" is an alkyl group, an acyl group or a group having at least one reactive double bound, R is an allyl group, an alkenyl group or a group of formula:

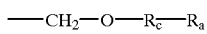

wherein $R_a$ is an alkyl or alkenyl group and $R_c$ is a segment of formula

wherein p is a whole number which varies between 0 and 25.

Particularly appropriate compositions are those wherein

Z is a residue of glycerin or trimethylolpropane and k is a number equal to 3, or Z is a residue of ethylene glycol and k is a number equal to 2;

iii) copolymer of type:

AB'"A described in PCT/FR92/10033, obtained by polycondensation reaction, wherein A represents a segment derived from homopolymers or copolymers of ethylene oxide or derivatives thereof, and B'" represents segments comprising radicals having at least one double bond (for example derivatives of alkynes, styrene or dimethylfuran). Another example is one wherein A is a POE or a copolymer POE/POP and B'" is a vinyl group:

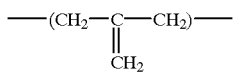

iv) random polyether copolymer of ethylene oxide and an ether oxide selected from the group consisting of substituted ether oxide of formula:

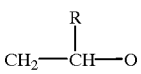

wherein R is $R_a$, wherein $R_a$ is an alkyl, alkenyl or alkynyl having 1 to 12 carbon atoms or —$CH_2$—O—$R_e$—$R_a$ wherein $R_a$ is defined above, $R_e$ is a polyether of the formula —($CH_2CH_2$—O$)_p$, wherein p is an integer from 0 to 10, or a cyclic ether wherein the ring has more than 3 carbon atoms.

The invention also relates to wood articles impregnated, preferably at a depth which corresponds to at least a given portion of the sapwood as required for the preservative itself, by the American Wood Preservers' Association (AWPA) or the Canadian Standards Association (CSA) with a polymeric network resulting from a treatment as defined above and characterized by a reduced hardness which is maintained substantially at the same level as immediately following the treatment, when the wood articles are allowed to age outside under leaching conditions. It is believed that these conditions are close to what takes place in nature where the posts are subject to all kinds of weather conditions.

DESCRIPTION OF PREFERRED EMBODIMENTS

In accordance with the present invention, red pine blocks 40 cm long by 8 cm wide were treated under conditions similar to those used in the industry. A solution is prepared according to the norms which are used in the industry by optionally adding to a volume of water a given amount of an inorganic preservative so as to obtain a concentration of 2% w/v of the said optionally present wood preservative. To this solution, there was included a variable quantity (4 to 10% w/v) of prepolymer and a quantity of polymerization initiator equal to 5% of the weight of the prepolymer.

The treatment under pressure was carried out in a stainless steel autoclave having a diameter of 25 cm and a length of 80 cm. Fixation of the optionally present inorganic preservative and polymerization are carried out during the same step called fixation-polymerization. This step is carried out at 95° C. in an atmosphere substantially free of oxygen for a period of 2.5 to 16 hours, depending on the dimensions of the block of red pine. The chosen temperature is dependent on the choice of the polymerization initiator. Five water soluble polymerization initiators having activation temperatures ($t_{1/2}$ of 44° C., 56° C., 61° C., 69° C. and 86° C.) respectively #1 to #5, were tested with substantially the same results. These polymerization initiators (commercially available from Wako Pure Chemical Industries Ltd.) are respectfully the following:

1) 2,2'azobis[2-(2-imidazolin-2-yl) propane]-dihydro chloride
2) azobis(2-amidinopropane)dihydro chloride
3) 2,2'-azobis[2-(2-imidazolin-2-yl)propane]
4) 4,4'-azobis(4-cyanovaleric acid)
5) 2,2'-azobis[2-methyl-N-(2-hydroxyethyl)-propionamide].

Other initiators that can be used include an oxidizing agent such as potassium sulfate.

The preferred initiator was initiator number 5 (t½=86° C.). A plurality of prepolymers have been used, e.g. polyethylene glycol diacrylates (PEGDA) and polyethylene glycol dimethacrylate (PEGDM), in which the average molecular weight varied between 200 and 1000, glycerol tri[poly (oxyethylene) (oxypropylene) monoacrylate] tri-(OE—OP—MA) having a molecular weight of 8000 and copolymer of ethylene oxide-butylene oxide-allyl glycidyl ether (OE—OB—AGE) having a molecular weight of 5000. All these prepolymers are soluble in an aqueous medium. The fixation-polymerization step enables to produce a tridimensional network which makes the polymers insoluble. Therefore, it is believed that the polymer fills the cavities of the wood structure. Because the resulting polymers form a network and are insoluble, their molecular weights cannot be characterized. The concentration of polymer in the wood after impregnation represents an average over the treated portion of the wood block and is evaluated by quantifying the prepolymer extracted from the wood before and after the polymerization takes place.

After the step of fixation-polymerization, the blocks of wood are oven-dried to decrease their moisture content to a value around 30%, as it is normally done in the industry. An additional oven-drying is carried out to reduce the moisture content between 15 and 20%, in order to be close to the moisture contents found in similar posts which are in service, for comparison purposes.

The moisture content of the blocks was measured in the first two centimeters of depth, because it may influence the hardness of the wood. The moisture contents measured and the corresponding standard deviation illustrate that the range of values is sufficiently restricted for these data to be compared with one another.

All the blocks treated under pressure were stuck at room temperature with a test machine using a mechanical gaff described by Gilbert et al. in Forest Products Journal, 47:3, (1997) pp 81–88. Some wood blocks were also stuck at −35° C. in order to evaluate the effect of temperature on the performance of the treatments. The results obtained are given in Table 1. This table also includes penetration values for red pine posts obtained from CCA-treated pole commercially available from a treating company, for comparison purposes.

The blocks for each treatment that includes a polymer have been separated into two groups, a group stuck as such and another one aged then stuck. Accelerated aging of the blocks in the laboratory enables to simulate an aging as established by comparison with CCA PEG 1000 treated poles that have been in service for a few years, in order to evaluate the permanence of the effect of the polymer additive in wood. It consists in an alternation of periods of spraying with demineralized water and periods of drying.

In accordance with an alternate embodiment, the treatment may be carried in the presence of air or oxygen.

In accordance with yet another yet another embodiment the wood preservative may include at least one reactive group enabling its introduction in the polymer matrix at the cross-linking step.

In accordance with another embodiment the wood preservative is chemically fixed in the prepolymer.

In accordance with another embodiment the wood preservative is solubilized in water using a surfactant material.

The invention will now be described by the examples which follow given only for the purpose of illustration without limitation. It will be noted that some of the results (moisture contents and concentration of the polymers in wood) are presented in the body of the examples, whereas others (spur penetration depths) are found in Table 1.

EXAMPLE 1

In an autoclave, we introduced three blocks of red pine 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 1936.1 g of polyethylene oxide dimethacrylate of molecular weight 600 and 101.34 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 16.2±3.4 kg/m$^3$ in the treated portion of the wood blocks.

After the treatment, the wood blocks are oven-dried to an average moisture content of 16.5±1.3% in the 0–2 cm depth. Their resistance to gaff penetration at 23° C. is lower than that of wood treated with CCA only, see Table 1.

EXAMPLE 2

In an autoclave, we introduced three wood blocks of 40 cm long by 8 cm wide obtained from a CCA-treated red pine pole. A vacuum of 636 mm Hg is applied to remove the air contained in the wood cells. A 50-L volume of solution A is obtained by adding 2017.3 g of polyethylene oxide dimethacrylate of molecular weight 600 and 96.42 g of 2,2'-azobis[2-methyl-N-(2-hydroxyethyl)-propionamide] to 50 L of water. A portion of solution A is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 17.4±2.7 kg/m$^3$ in the treated portion of the wood blocks.

After the treatment, the wood blocks are oven-dried to an average moisture content of 18.7±0.8% in the 0–2 cm depth. Their resistance to gaff penetration at 23° C. is lower than that of wood treated with CCA only, see Table 1.

EXAMPLE 2a

In an autoclave, we introduced three wood blocks of 40 cm long by 8 cm wide obtained from a CCA-treated red pine pole. A vacuum of 636 mm Hg is applied to remove the air contained in the wood cells. A 50-L volume of solution A is obtained by adding 1846.2 g of polyethylene oxide dimethacrylate of molecular weight 600 and 101.04 g of 2,2'-azobis[2-methyl-N-(2-hydroxyethyl)-propionamide] to 50 L of water. A portion of the solution A is introduced into the autoclave at a maximum pressure of 1040 kPa. The pressure is maintained for 5 hours and the solution is thereafter flushed away. The polymerization is done in the autoclave under an air atmosphere at 95° C. during 6 hours, leading to an average concentration of PEGDM of 6.7±0.9 kg/m$^3$ in the treated portion of the wood blocks.

EXAMPLE 2b

In an autoclave, we introduced three wood blocks 40 cm long by 8 cm wide obtained from a CCA-treated red pine pole. A vacuum of 636 mm Hg is applied to remove the air contained in the wood cells. A 50-L volume of solution A is obtained by adding 1939.1 g of polyethylene oxide dimethacrylate of molecular weight 600 and 100.53 g of potassium persulphate to 50 L of water. A portion of solution A is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 12.3±1.1 kg/m$^3$ in the treated portion of the wood blocks

EXAMPLE 3

In an autoclave, we introduced three blocks of untreated red pine 40 cm long by 8 cm wide. A vacuum of 636 mm Hg is applied to remove the air contained in the wood cells. A 50-L volume of solution A is obtained by adding 2103.4 g of polyethylene oxide dimethacrylate of molecular weight 600 and 99,72 g of 2,2'-azobis[2-methyl-N-(2-hydroxyethyl)-propionamide] to 50 L of water. A portion of solution A is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 19.3±1.7 kg/m$^3$ in the treated portion of the wood blocks.

After the treatment, the wood blocks are oven-dried to an average moisture content of 20.1±1.9% in the 0–2 cm depth. Their resistance to gaff penetration is lower than that of wood treated with CCA only, see Table 1.

EXAMPLE 4

In an autoclave, we introduced three blocks of red pine of 40 cm long by 8 cm wide. A vacuum of 636 mm Hg is applied to remove the air contained in the wood cells. A solution A is obtained by adding 1037.3 g of $CrO_3$ to 50 L of water. A solution B is obtained by adding 2046.8 g of polyethylene oxide dimethacrylate of molecular weight 600 and 103.47 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 14.9±0.6 kg/m$^3$ in the treated portion of the wood blocks.

After the treatment, the wood blocks are oven-dried to an average moisture content of 12.4±1.0% in the 0–2 cm depth. Their resistance to gaff penetration is lower than that of wood treated with CCA only, see Table 1.

EXAMPLE 5

In an autoclave, we introduced three blocks of red pine of 40 cm long by 8 cm wide. A vacuum of 636 mm Hg is applied to remove the air contained in the wood cells. A solution A is obtained by adding 992.4 g of CuO to 50 L of water. A solution B is obtained by adding 1920.6 g of polyethylene oxide dimethacrylate molecular weight of 600 and 98.59 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 21.7±1.4 kg/m in the treated portion of the wood blocks.

After the treatment, the wood blocks are oven-dried to an average moisture content of 18.1±1.6% in the 0–2 cm depth. Their resistance to gaff penetration is lower than that of wood treated with CCA only, see Table 1.

EXAMPLE 6

In an autoclave, we introduced three blocks of red pine of 40 cm long by 8 cm wide. A vacuum of 636 mm Hg is applied to remove the air contained in the wood cells. A solution A is obtained by adding 1078.5 g of $As_2O_3$ to 50 L of water. A solution B is obtained by adding 1998.3 g of polyethylene oxide dimethacrylate of molecular weight 600 and 101.13 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 20.8±2.4 kg/m$^3$ in the treated portion of the wood blocks.

After the treatment, the wood blocks are oven-dried to an average moisture content of 19.6±1.7% in the 0–2 cm depth. Their resistance to gaff penetration is lower than that of wood treated with CCA only, see Table 1.

EXAMPLE 7

In an autoclave, we introduced a block of red pine of 40 cm long by 8 cm wide. A vacuum of 636 mm Hg is applied to remove the air contained in the wood cells. A solution A is obtained by adding 1022.1 g of ZnO to 50 L of water. A solution B is obtained by adding 2058.0 g of polyethylene oxide dimethacrylate of molecular weight 600 and 93.51 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 18.0±1.8 kg/m$^3$ in the treated portion of the wood blocks.

After the treatment, the wood blocks are oven-dried to an average moisture content of 13.6±2.2% in the 0–2 cm depth. Their resistance to gaff penetration is lower than that of wood treated with CCA only, see Table 1.

EXAMPLE 8

In an autoclave, we introduced three blocks of red pine of 40 cm long by 8 cm wide. A vacuum of 636 mm Hg is applied to remove the air contained in the wood cells. A solution A is obtained by adding 1132.1 g of $H_3BO_3$ to 50 L of water. A solution B is obtained by adding 2004.7 g of polyethylene oxide dimethacrylate of molecular weight 600 and 98.68 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 23.1±1.6 kg/m$^3$ in the treated portion of the wood blocks.

After the treatment, the wood blocks are oven-dried to an average moisture content of 17.2±1.8% in the 0–2 cm depth. Their resistance to gaff penetration is lower than that of wood treated with CCA only, see Table 1.

EXAMPLE 9

In an autoclave, we introduced three blocks of red pine of 40 cm long by 8 cm wide. A vacuum of 636 mm Hg is applied to remove the air contained in the wood cells. A solution A is obtained by adding 976.8 g of NaF to 50 L of water. A solution B is obtained by adding 2071.5 g of polyethylene oxide dimethacrylate of molecular weight 600 and 102.24 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 31.4±4.1 kg/m$^3$ in the treated portion of the wood blocks.

After the treatment, the wood blocks are oven-dried to an average moisture content of 23.8±2.9% in the 0–2 cm depth. Their resistance to gaff penetration is lower than that of wood treated with CCA only, see Table 1.

EXAMPLE 10

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 2143.2 g of polyethylene oxide dimethacrylate of molecular weight 600 and 100.77 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 18.5±0.8 kg/m$^3$ in the treated portion of the wood blocks.

After the treatment, the wood blocks are oven-dried to an average moisture content of 17.4±1.5% in the 0–2 cm depth, and aged as described previously using alternations of water spraying and air-drying. Their resistance to gaff penetration at 23° C. is lower than that of wood treated with CCA only, see Table 1.

EXAMPLE 11

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 1936.1 g of polyethylene oxide dimethacrylate of molecular weight 600 and 101.34 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 16.2±3.4 kg/m$^3$ in the treated portion of the wood blocks.

After the treatment, the wood blocks are oven-dried to an average moisture content of 16.5±1.3% in the 0–2 cm depth. Their resistance to gaff penetration at −35° C. is lower than that of wood treated with CCA only, see Table 1.

EXAMPLE 12

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 2143.2 g of polyethylene oxide dimethacrylate of molecular weight 600 and 100.77 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 18.5±0.8 kg/m in the treated portion of the wood blocks.

After the treatment, the wood blocks are oven-dried to an average moisture content of 17.4±1.5% in the 0–2 cm depth, and aged as described previously using alternations of water spraying and air-drying. Their resistance to gaff penetration at −35° C. is lower than that of wood treated with CCA only, see Table 1.

EXAMPLE 13

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 5103.7 g of polyethylene oxide dimethacrylate of molecular weight 600 and 247.21 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 47.5±4.6 kg/m$^3$ in the treated portion of the wood blocks.

After the treatment, the wood blocks are oven-dried to an average moisture content of 18.2±2.1% in the 0–2 cm depth. Their resistance to gaff penetration at 23° C. is lower than that of wood treated with CCA only, see Table 1.

EXAMPLE 14

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 5052.5 g of polyethylene oxide dimethacrylate of molecular weight 600 and 254.34 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 45.6±11.4 kg/m$^3$ in the treated portion of the wood blocks.

After the treatment, the wood blocks are oven-dried to an average moisture content of 20.1±2.5% in the 0–2 cm depth, and aged as described previously using alternations of water spraying and air-drying. Their resistance to gaff penetration at 23° C. is lower than that of wood treated with CCA only, see Table 1.

EXAMPLE 15

In an autoclave, we introduced three blocks of red pine of 40 cm long by 8 cm wide. A vacuum of 636 mm Hg is applied to remove the air continued in the wood cells. A 50-L volume of solution A is obtained by diluting 2 L of a 50% w/v solution of chromium copper arsenate (CCA) with water. A solution B is obtained by adding 5103.7 g of polyethylene oxide dimethacrylate of molecular weight 600 and 247.21 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 47.5±4.6 kg/m$^3$ in the treated portion of the wood blocks.

After the treatment, the wood blocks are oven-dried to an average moisture content of 18.2±2.1% in the 0–2 cm depth. Their resistance to gaff penetration at −35° C. is lower than that of wood treated with CCA only, see Table 1.

EXAMPLE 16

In an autoclave, we introduced three blocks of red pine of 40 cm long by 8 cm wide. A vacuum of 636 mm Hg is applied to remove the air contained in the wood cells. A 50-L volume of solution A is obtained by is diluting 2 L of a 50% w/v solution of chromium copper arsenate (CCA) with water. A solution B is obtained by adding 5052.5 g of polyethylene oxide dimethacrylate of molecular weight 600 and 254.34 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 45.6±11.4 kg/m$^3$ in the treated portion of the wood blocks.

After the treatment, the wood blocks are oven-dried to an average moisture content of 20.1±2.5% in the 0–2 cm depth, and aged as described previously using alternations of water spraying and air-drying. Their resistance to gaff penetration at −35° C. is lower than that of wood treated with CCA only, see Table 1.

EXAMPLE 17

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 2006.9 g of polyethylene oxide diacrylate of molecular weight 200 and 98.04 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDA of 13.4±1.5 kg/m$^3$ in the treated portion of the wood blocks.

After the treatment, the wood blocks are oven-dried to an average moisture content of 15.8±2.2% in the 0–2 cm depth. Their resistance to gaff penetration at 23° C. is lower than that of wood treated with CCA only, see Table 1.

EXAMPLE 18

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 1807.3 g of polyethylene oxide diacrylate of molecular weight 200, 194.29 g of trimethylolpropane triacrylate (TMPTA) and 101.72 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDA of 12.1±1.0 kg/m$^3$ and of TMPTA of 2.4±0.3 kg/m$^3$ in the treated portion of the wood blocks.

After the treatment, the wood blocks are oven-dried to an average moisture content of 17.1±1.9% in the 0–2 cm depth. Their resistance to gaff penetration at 23° C. is lower than that of wood treated with CCA only, see Table 1.

EXAMPLE 19

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 2073.2 g of polyethylene oxide diacrylate of molecular weight 200 and 97.18 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDA of 9.7±3.2 kg/m$^3$ in the treated portion of the wood blocks.

After the treatment, the wood blocks are oven-dried to an average moisture content of 19.5±1.9% in the 0–2 cm depth, and aged as described previously using alternations of water spraying and air-drying. Their resistance to gaff penetration at 23° C. is lower than that of wood treated with CCA only, see Table 1.

EXAMPLE 20

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 1969.2 g of a copolymer of ethylene oxide-buthylene oxide-allyl glycidyl ether (OE—OB—AGE) having a molecular weight 5000 and 102.46 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of OE—OB—AGE of 11.2±1.1 kg/m$^3$ in the treated portion of the wood blocks.

After the treatment, the wood blocks are oven-dried to an average moisture content of 16.4±2.1% in the 0–2 cm depth. Their resistance to gaff penetration at 23° C. is lower than that of wood treated with CCA only, see Table 1.

EXAMPLE 21

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 4984.6 g of glycerol tri[poly(oxyethylene)(oxypropylene)monoacrylate] tri-(OE—OP—MA) having a molecular weight 8000 and 251.50 g of 2,2'-azobis[2-methyl-N-(2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of tri-(OE—OP—MA) of 21.1±3.6 kg/m$^3$ in the treated portion of the wood blocks.

After the treatment, the wood blocks are oven-dried to an average moisture content of 18.4±2.7% in the 0–2 cm depth. Their resistance to gaff penetration at 23° C. is lower than that of wood treated with CCA only, see Table 1.

EXAMPLE 22

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 2010.1 g of polyethylene oxide dimethacrylate of molecular weight 600 and 98.58 g of 2,2'azobis[2-(2-imidazolin-2-yl) propane]-dihydro chloride to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 55° C. during 6 hours, leading to an average concentration of PEGDM of 14.2±0.9 kg/m$^3$ in the treated portion of the wood blocks.

After the treatment, the wood blocks are oven-dried to an average moisture content of 17.3±2.0% in the 0–2 cm depth. Their resistance to gaff penetration at 23° C. is lower than that of wood treated with CCA only, see Table 1.

EXAMPLE 23

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 1994.3 g of polyethylene oxide dimethacrylate of molecular weight 600 and 100.39 g of azobis(2-amidinopropane)dihydro chloride to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 65° C. during 6 hours, leading to an average concentration of PEGDM of 15.8±1.2 kg/m$^3$ in the treated portion of the wood blocks.

After the treatment, the wood blocks are oven-dried to an average moisture content of 16.5±1.8% in the 0–2 cm depth. Their resistance to gaff penetration at 23° C. is lower than that of wood treated with CCA only, see Table 1.

EXAMPLE 24

In an autoclave, we introduced three blocks of red pine of 40 cm long by 8 cm wide. A vacuum of 636 mm Hg is applied to remove the air contained in the wood cells. A 50-L volume of solution A is obtained by diluting 2 L of a 50% w/v solution of chromium copper arsenate (CCA) with water. A solution B is obtained by adding 1532.1 g of polyethylene oxide dimethacrylate having a molecular weight of 600 and 3478.7 g of glycerol tri[poly(oxyethylene)(oxypropylene)monoacrylate] tri-(OE—OP—MA) having a molecular weight 8000 and 248.25 g of 2,2'-azobis[2-methyl-N-( 2-hydroxyethyl)-propionamide] to the 50-L volume of solution A. A portion of solution B is introduced into the autoclave at a maximum pressure of 1040 kPa. The pressure is maintained for 5 hours and the solution is thereafter flushed away. The polymerization is done in the autoclave under an inert atmosphere at 95° C. during 6 hours, leading to an average concentration of PEGDM of 12.2±1.4 kg/m$^3$ and an average concentration of tri-(OE—OP—MA) of 6.4±0.5 kg/m$^3$ in the treated portion of the wood blocks.

After the treatment, the wood blocks are oven-dried to an average moisture content of 19.0±1.6% in the 0–2 cm depth. Their resistance to gaff penetration at 23° C. is lower than that of wood treated with CCA only, see Table 1.

TABLE 1

Depths of penetration of a gaff at a force of 1778 N in wood samples treated with various preservatives and prepolymer additives

| Example | Treatment | Concentration of polymer in the treating solution (% w/v) | Gaff penetration depth at a force of 1778 N (mm) ± S.D.[+] |
|---|---|---|---|
| Ref. 1[++] | CCA | 0 | 15.0 ± 1.7 |
| 1 | CCA-PEGDM | 4 | 23.6 ± 2.2 |
| 2 | PEGDM | 4 | 23.2 ± 1.8 |
| 3 | PEGDM | 4 | 24.1 ± 2.0 |
| 4 | CrO$_3$-PEGDM | 4 | 22.9 ± 1.9 |
| 5 | CuO-PEGDM | 4 | 25.2 ± 2.5 |
| 6 | As$_2$O$_3$-PEGDM | 4 | 23.8 ± 2.1 |
| 7 | ZnO-PEGDM | 4 | 21.7 ± 1.3 |
| 8 | H$_3$BO$_3$-PEGDM | 4 | 22.1 ± 1.8 |
| 9 | NaF-PEGDM | 4 | 25.3 ± 2.2 |
| 10 | CCA-PEGDM | 4 | 22.8 ± 2.5 |
| 11 | CCA-PEGDM | 4 | 19.3 ± 2.0 |
| 12 | CCA-PEGDM | 4 | 18.1 ± 1.2 |
| 13 | CCA-PEGDM | 10 | 28.9 ± 2.0 |
| 14 | CCA-PEGDM | 10 | 28.6 ± 1.8 |
| 15 | CCA-PEGDM | 10 | 22.9 ± 0.65 |
| 16 | CCA-PEGDM | 10 | 23.8 ± 0.90 |
| 17 | CCA-PEGDA | 4 | 15.4 ± 2.0 |
| 18 | CCA-PEGDA-TMPTA | 3.6 0.4 | 17.6 ± 1.8 |
| 19 | CCA-PEGDA | 4 | 16.7 ± 1.9 |
| 20 | CCA-(OE-OB-AGE) | 4 | 15.8 ± 1.6 |
| 21 | CCA-tri-(OE-OP-MA) | 10 | 17.2 ± 1.1 |
| 22 | CCA-PEGDM | 4 | 22.4 ± 1.7 |
| 23 | CCA-PEGDM | 4 | 21.6 ± 1.8 |
| 24 | CCA-[PEGDM-tri-(OE-OP-MA)] | 3 7 | 19.5 ± 2.1 |

[+]Standard deviation
[++]Tests made with posts as supplied by a treating company Although a particular embodiment has been described, this was for the purpose of illustrating, but not limiting, the invention. Various modifications, which will come readily to the mind of one skilled in the art, are within the scope of the invention as defined in the appended claims.

We claim:

1. In a method for the treatment of wood which includes the steps of:
   (a) providing articles of wood;
   (b) introducing said articles of wood into an autoclave under conditions to substantially remove air contained therein,
   (c) introducing into said autoclave a treatment solution and impregnating said articles of wood therewith, and
   (d) submitting articles of wood impregnated with said treatment solution to a temperature higher than ambient, the improvement (I) wherein
      i) said treatment solution comprises a water soluble prepolymer of low molecular weight (<10,000) having reactive groups which can be specifically localized at the end of the main or lateral chains, or statistically or block distributed in the main chain, said reactive groups enabling cross-linking being selected from allyl, vinyl, acrylate or methacrylate or issued from compounds having at least one reactive double bond, in order to ensure a multi-dimensional cross-linking, and a polymerization initiator, said prepolymer being cross-linkable in said wood and wherein
      ii) step (c) is carried out in a gaseous atmosphere under conditions which allow for the polymerization of said prepolymer, thereby reducing the hardness of said wood as compared to wood treated with chromated copper arsenate (CCA) only when said wood is at the same moisture content, and increasing the moisture content of said wood at equilibrium as compared to wood treated with CCA only, while ensuring reduced hardness and increased moisture content to be maintained during aging of said wood outside, under leaching conditions, substantially at the same level as immediately following said treatment.

2. Method according to claim 1, wherein said atmosphere is an inert atmosphere which is substantially free of oxygen.

3. Method according to claim 1, wherein said atmosphere comprises oxygen.

4. Method according to claim 1 wherein said articles of wood treated in step (d) are free of wood preservative.

5. Method according to claim 1 which comprises providing articles of wood pre-treated with a wood preservative.

6. Method according to claim 1 which comprises adding a wood preservative into said treatment solution, and impregnating said articles of wood with said wood preservative during step (c).

7. Method according to claim 1 which comprises impregnating a wood preservative into said wood articles before introducing same into said treatment solution, said treatment solution being substantially free of said wood preservative.

8. Method according to claim 5 wherein said treatment solution comprises water, said polymerization initiator and said water soluble prepolymer, said prepolymer being cross-linkable in said wood in the presence of said wood preservative.

9. Method according to claim 1 wherein said treatment solution is prepared by adding said water soluble prepolymer to a solution of said wood preservative, said prepolymer being cross-linkable in said wood in the presence of said wood preservative, and adding a polymerization initiator to the solution previously obtained.

10. Method according to claim 6, wherein said wood preservatives are based on copper or chromium or arsenic or zinc or boron or fluorine or phosphorous compounds or a combination of at least two of these compounds.

11. Method according to claim 10, wherein the wood preservative comprises chromated copper arsenate.

12. Method according to claim 6, wherein said wood preservative having at least one reactive group enabling its introduction in the polymer matrix at the cross-linking step, said reactive group selected from allyl vinyl, acrylate or methacrylate or issued from compounds having at least one reactive double bond.

13. Method according to claim 12, wherein said wood preservative comprises water-soluble salts.

14. Method according to claim 13, wherein said water-soluble salts comprise acrylate of Cu, Cr, Zn.

15. Method according to claim 6, wherein said wood preservative is chemically fixed in said pre-polymer.

16. Method according to claim 6, wherein said wood preservative is solubilized in water using surfactant material.

17. Method according to claim 16, wherein said wood preservative comprises pentachlorophenol.

18. Method according to claim 1, wherein the first step is carried out under a vacuum of about 600–650 mm Hg.

19. Method according to claim 11, wherein said solution contains about 2% w/v of chromated copper arsenate.

20. Method according to claim 19, wherein said solution is introduced into said autoclave at a pressure of about 1000–1040 kPa so as to facilitate penetration of the preservative into wood.

21. Method according to claim 20, wherein said pressure is maintained for a period of time that allows for penetration of said chemicals in sapwood, after which the solution is flushed away from the autoclave and temperature is then maintained within a range from 25° C. to 100° C. for a period of time that allows for a substantial fixation of all the CCA components in the wood and a polymerization of the prepolymers in the wood.

22. Method according to claim 1, wherein said solution contains about 4 to 10% w/v of said prepolymer and up to about 5 weight percent of said polymerization initiator with respect to said prepolymer.

23. Method according to claim 21, wherein said third step is carried out at a temperature between about 25 and 100° C. for about 2.5 to 48 hours.

24. Method according to claim 1, wherein said solution contains a crosslinking agent in a concentration between 1 to 20% v/v with respect to said prepolymer.

25. Method according to claim 24, wherein said crosslinking agent is selected from the group consisting of trimethylolpropane trimethacrylate, trimethylolpropane triacrylate, glycerol trimethacrylate and glycerol triacrylate.

26. Method according to claim 1, wherein said prepolymer is a copolymer of formula:

wherein A is a homopolymer or copolymer of ethylene oxide or derivatives thereof, and B' is an acrylate group of the formula:

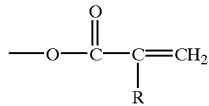

wherein R is H or $CH_3$.

27. Method according to claim 26, wherein said prepolymer is a polyethylene glycol diacrylate or dimethacrylate.

28. Method according to claim 1, wherein said prepolymer is a copolymer of formula:

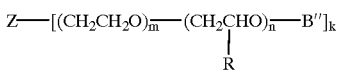

wherein
- Z is a residue of a compound having at least one active hydrogen,
- k is a whole number between 1 and 6,
- m is a number equal to 0 or whole number not less than 1,
- n is a number equal to 0 or whole number not less than 1,
- B″ is an alkyl group, an acyl group or a group having at least one reactive double bound,
- R is an allyl group, an alkenyl group or a group of formula:

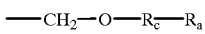

wherein
- $R_a$ is an alkyl or alkenyl group and $R_c$ is a segment of formula

wherein p is whole number which varies between 0 and 25.

29. Method according to claim 28 wherein
   Z is a residue of glycerin or trimethylolpropane and k is a number equal to 3.

30. Method according to claim 28 wherein
   Z is a residue of ethylene glycol and k is a number equal to 2.

31. Method according to claim 1, wherein said prepolymer is a copolymer of type:

wherein A represents a segment derived from homopolymers or copolymers of ethylene oxide or derivatives thereof, and B‴ represents segments comprising of radicals having at least one double bond.

32. Method according to claim 31, wherein B‴ comprises radicals derived from alkynes, styrene or dimethylfurane.

33. Method according to claim 31, wherein A represents a POE or a copolymer POE/POP and B‴ is a vinyl group:

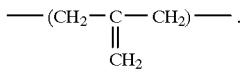

34. Method according to claim 1, wherein said prepolymer is a random polyether copolymer of ethylene oxide and an ether oxide selected from the group consisting of substituted ether oxide of formula:

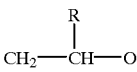

wherein R is $R_a$, wherein $R_a$ is an alkyl, alkenyl or alkylnyl having 1 to 12 carbon atoms or —CH$_2$—O—R$_e$—R$_a$ wherein $R_a$ is defined above, $R_e$ is a polyether of the formula —(CH$_2$CH$_2$—O)$_p$, wherein p is an integer from 0 to 10 or a cyclic ether wherein the ring has more than 3 carbon atoms.

35. Method according to claim 1, wherein said polymerization initiator is selected from the group consisting of:
   1) 2,2′azobis[2-(2-imidazolin-2-yl)propane]-dihydro chloride
   2) azobis(2-amidinopropane)dihydro chloride
   3) 2,2′-azobis[2-(2-imidazolin-2-yl)propane]
   4) 4,4-azobis(4-cyanovaleric acid)
   5) 2,2′-azobis[2-methyl-N-(2-hydroxyethyl)-propionamide.

36. Method according to claim 1, wherein said polymerization initiator consists of an oxidizing agent.

37. Method according to claim 36, wherein said oxidizing agent consists of potassium persulphate.

* * * * *